Patented Jan. 1, 1952

2,581,058

UNITED STATES PATENT OFFICE 2,581,058

COATINGS FOR INSULATION BOARD

John K. Wise, Evanston, Ill., assignor to United States Gypsum Company, Chicago, Ill., a corporation of Illinois No Drawing. Application July 21, 1947, Serial No. 762,544

5 Claims. (Cl. 106—214)

The present invention relates to improvements in coatings as applied to relatively porous insulating boards, with especial emphasis upon the application of the coatings to the insulation board at that stage of its manufacture where it is still wet, so that the drying of the board and of the coating can take place simultaneously.

Attempts have been made to do this, but it was soon discovered that unless special precautions were taken by the incorporation of the steps of the present invention, as hereinbelow more fully stated, the coatings would be uneven and of an unsightly, blotched appearance. This was noticeable even with white coating, containing a starch vehicle and a water-dispersed clay, and was particularly marked with tinted and colored coatings, such as are usually applied to insulation board that is intended as the interior surface of houses. In such cases it was also found that it was virtually impossible to maintain a uniform shade or color over an extended period of time, even though the same batch of coating composition was used during the entire run.

It was further discovered that this irregularity in appearance was occasioned by what may properly be termed the "migration" of the various components of the coating composition, which phenomenon is markedly accentuated when the coating is applied to the wet insulation board. This migration is believed to be caused by:

(1) Seepage of water-soluble materials in the wet insulating board mat to the surface during the drying operation;

(2) Migration of a starch film to the surface of the coating;

(3) The rising of pigment particles to the surface together with the migration of the starch.

In the case of light colored coatings, such as white or ivory tints, causes 1 and 2 are believed to account for the major share of the migration, while in the case of the darker colors, the third cause appears to be the most important contributing factor. The degree to which migration affects the final color of the coating may be determined by preparing two coatings containing the same quantities of colored pigments; one of the coatings being made with, and the other without, the conventional amount of starch binder vehicle. It will be found that upon the application of these coatings to any material, such as glass, wood, or insulation board, the dry coating containing the starch vehicle will be considerably darker in color than the one containing no binder. It will further be found that the difference in color between the coatings will largely depend on the thickness of the coating applied; in other words, the thicker the coating, the greater will be the difference in color. Another factor is the percentage of water in the coating, as this also influences the amount of migration.

Migration in starch coatings thus depends primarily upon two factors:

(1) The amount of water present in the coating, which, in turn, determines the rate of drying after its application to the surface of the board. Obviously, the longer the drying time, the more starch (and pigment particles carried thereby) can rise to the surface.

(2) The thickness of the coating film likewise produces a disturbing effect. When a thin film of coating is applied to the board, only relatively small quantities of starch and pigment can rise to the surface of the coating; while, conversely, when a heavier coat is applied, larger amounts of starch and pigment can migrate during the drying operation.

It might be believed that most of these difficulties could be resolved by the proper control of uniformity in the coating compositions and accuracy in their application, but this is defeated by the fact that the inherent and characteristic texture of the insulating board is such as to preclude the application of an even coating over every portion of its surface. When it is considered that insulation board is made by continuously filtering out a dilute suspension of more or less heavily sized fibers on a filter wheel, such as that of an Oliver type of board-forming machine, and that the resultant wet board is then compressed between absorbent felts which are pressed against the board by rollers, it will at once be evident that it could not possibly have a sufficiently smooth surface to permit the application of an entirely even coating. The board will also be unequally absorbent on its surface, and will contain low spots as well. It relatively rough texture also precludes the use of a doctor blade, and the coating must be applied by means which do not tear up the surface of the board. Usually, such coatings are applied by a pool and roller method, a pool of the coating composition being maintained just ahead of a spreading roller which controls, within the limits as just defined, the thickness of the coating. While the distance of the roller from the highest portions of the board can be accurately adjusted, yet the low spots will unavoidably be provided with a thicker coating.

The present invention has for its primary object the production of coatings on still wet insulation boards, which coatings will dry uniformly to an even and pleasing appearing surface, which can be used for decorative purposes, without requiring re-coating or painting by the user.

A further object is to provide a coating so constituted that migration of the vehicle and the pigments and fillers therein will be sufficiently repressed, or totally avoided, if the coating is rapidly dried, as at higher than room temperatures, to the effect that uniform coating can be secured.

Further objects of the invention will appear from the more detailed description to follow.

The novel feature of the present invention is the incorporation, with a vehicle consisting of starch in which pigments, fillers and colors are suspended, of a suitable amount of a reaction compound of a higher fatty acid with a polyethylene glycol.

It appears that such a reaction compound will prevent the migration of the starch vehicle and of the pigments, particularly if the coating is dried at a high temperature where rapid evaporation of water therefrom takes place, so that a coating will be obtained which is devoid of the difficulties hereinabove described. This additive material may be incorporated with the coating composition at almost any stage of its manufacture but it is preferred to add the material after it has otherwise been completely compounded.

A suitable composition may consist of the following ingredients, in about the proportions given (which are the amounts present in the finished composition in the form in which it is ready for application to the still wet insulating board):

| | Parts by weight |
|---|---|
| Starch (gelatinized) | 25 |
| Clay | 128 |
| Ground mica | 40 |
| Tetrasodium pyrophosphate | 0.6 |
| Pigments | 20 |
| Polyethylene glycol-fatty acid reaction product | 20 to 40 |
| Water | 150 to 250 |

The following is an operative example of one method of successfully compounding the above coating composition:

100 pounds of a thin-boiling starch (for instance a mixture of pearl starch and oxidized starch) are suspended in 640 pounds of water to form a starch milk, which is then cooked at about 200° F. for about 15 minutes to produce a thoroughly gelatinized starch solution. In another tank containing 720 pounds of water, 700 pounds of white coating clay and 250 pounds of finely ground mica, of the type used in making paper-coating compositions, are added, being dispersed in the water by the aid of 3.5 pounds of tetrasodium pyrophosphate as a deflocculating agent, so that a smooth suspension of the clay and the mica will result. The previously made starch solution is now combined with the clay and mica suspension and the mixture stirred until uniform. If a colored coating is to be made, the colors are first blended with the clay and mica suspension prior to the addition of the starch solution. There are added 100 pounds of the polyethylene glycol-fatty acid reaction compound, which is preferably of a type made in accordance with the example given hereinbelow; and the resulting mixture is then further stirred until it is homogeneous and smooth, and finally made up to a volume of 116 gallons by the addition of sufficient water.

The polyethylene glycol-fatty acid compound should either be used at a temperature at which it is still liquid, or an emulsion or suspension thereof employed, as will more fully appear hereinbelow.

The coating thus prepared is then applied to the wet insulation board, preferably at a time when it is still on the forming-machine and before the continuous ribbon of wet insulation board is cut into individual board lengths. The coating method may be any that is now in use, although the "pool and roller" method is the preferred manner of applying the composition. A very effective way to apply the coating composition is to pour it onto the moving wet board, through a pipe provided with numerous perforations, directly ahead of a suitable distributing roller, so that a more or less constant pool of coating composition will be built up ahead of the roller. The coating composition may be supplied from a suitably elevated supply tank, running to the perforated pipe by gravity, or it may be pumped from a lower elevation. Such means and methods of coating are very well known in the art, and hence require no illustration or further explanation as they will be fully understood by those skilled in the art. The board then proceeds into a drier, in which it, as well as the coating, is dried.

The polyethylene glycol-fatty acid reaction compound, which may conveniently be referred to as the "ester," is preferably derived by reaction with stearic acid or other fatty acid. The fatty acids may, moreover, be either saturated or unsaturated. The polyethylene glycols are preferably those with a high molecular weight, say from about 3000 to 4000, having a freezing point range of about 50° to 55° C., and a density of about 1.204. Such polyethylene glycols are articles of commerce and readily obtainable to specifications. The fatty acids used to react these polyethylene glycols to form what might be called a "polyethylene glycol ester" are preferably within the group having from about 12 to 24 carbon atoms per molecule, stearic acid being an excellent example thereof. For commercial purposes, however, it is less expensive to utilize a mixture of commercially obtainable so-called "mixed animal fatty acids," such as can be purchased from meat packers. A suitable "mixed animal fatty acid" may have the following composition:

| | |
|---|---|
| Titre | 41–42 |
| Free fatty acids | 100–103 |
| Saponification number | 199–205 |
| Iodine number | 55–60 |

This contains a preponderant amount of stearic acid.

To produce the "polyethylene glycol ester" of such a fatty acid mixture, the following procedure may be employed with satisfactory results from the viewpoint of the present invention:

500 parts by weight of a polyethylene glycol of the type hereinabove mentioned are heated with 500 parts by weight of the mixed animal fatty acids to about 450° F. for about 2 hours, while constantly stirring the mixture. At the end of this time, the mixture may be cooled to about 200 to 300° F., strained to remove any extraneous material or insoluble particles, and then dissolved in water at the rate of 1 part by weight of the resulting polyethylene glycol fatty acid ester and 3 parts by weight of water, which will form a suitable emulsion or suspension for use as above mentioned. In the formula hereinabove given, the amount of polyethylene glycol fatty acid ester is given as the absolute weight thereof, discounting the water. It is for this reason that in the formula the final amount of added water is indefinite, the actual amount being whatever is necessary to bring the volume of the finished coating composition to 116 gallons, as stated in connection with the formula for compounding the coating composition.

The "polyethylene glycol ester" of the fatty acids as made above may comprise a mixture of the monoester and the diester. From the above proportions, using 500 pounds each of the polyethylene glycol and fatty acid, it is apparent that enough fatty acid is used to produce the diester, but it is not definitely known whether the reaction goes to completion. A greater than stoichometric amount of the fatty acid is used than would be theoretically combinable with the polyethylene glycol. In any event, an "ester" produced in accordance with the above instructions will be found to be suitable for the production of the coating composition of the present invention.

The choice of fillers and pigments is, obviously, quite large, depending upon the color of the coating. The clay and mica are both fillers, although in the case of white or light-colored coating compositions they may also play the dual role of pigments. Other white pigments such as titanium dioxide (preferably on barium sulfate), satin-white, zinc oxide, etc., may also be used. Colored pigments may include chromium oxide, cadmium sulfide, ultramarine and various color-lakes, lamp-black and the like. Hence, in the subjoined claims, the term "pigment-fillers" is used as a collective designation of pigments and fillers.

Obvious equivalents, and mixing techniques known to the art, are to be construed as within the scope of the present invention for which the applicant claims:

1. A coating composition suitable for application to wet insulating board comprising an aqueous gelatinized starch vehicle and an ester of a fatty acid, having from 12 to 24 carbon atoms, and a polyethylene glycol having a molecular weight of from about 3000 to 4000.

2. A coating composition as defined in claim 1, in which the fatty acid comprises a predominant amount of stearic acid.

3. A coating composition as defined in claim 1, in which a stoichiometric excess of the fatty acid is used above that required to form the diester of the polyethylene glycol.

4. A coating composition as defined in claim 1, containing pigment-fillers.

5. Decorative insulating board coated with a dried composition comprising gelatinized starch, pigment-fillers, and an ester of a fatty acid, having from 12 to 24 carbon atoms, and a polyethylene glycol having a molecular weight of from about 3000 to 4000.

JOHN K. WISE.

REFERENCES CITED

The following references are of record in the file of this patent:

UNITED STATES PATENTS

| Number | Name | Date |
|---|---|---|
| 1,863,731 | Schorger | June 21, 1932 |
| 1,889,851 | Crane | Dec. 6, 1932 |
| 1,982,018 | Owen | Nov. 27, 1934 |
| 2,059,343 | Hadfield | Nov. 3, 1936 |
| 2,229,620 | Bradner | Jan. 21, 1941 |
| 2,255,208 | Fife | Sept. 9, 1941 |
| 2,275,494 | Bennett | Mar. 10, 1942 |
| 2,287,161 | Ball | June 23, 1942 |
| 2,370,266 | Smith et al. | Feb. 27, 1945 |
| 2,378,113 | Van De Carr | June 12, 1945 |
| 2,380,166 | Griffin | July 10, 1945 |
| 2,390,202 | Burrell | Dec. 4, 1945 |
| 2,394,233 | Craig | Feb. 5, 1946 |

FOREIGN PATENTS

| Number | Country | Date |
|---|---|---|
| 431,275 | Great Britain | July 4, 1935 |

OTHER REFERENCES

"Carbowax Compounds and Polyethylene Glycols," Carbide & Carbon Chem. Corp., 30 E. 42d St., N. Y. 17, N. Y., 1946, pgs. 3-9.